(12) United States Patent
Whitesmith et al.

(10) Patent No.: US 7,408,456 B2
(45) Date of Patent: Aug. 5, 2008

(54) WIRELESS COMMUNICATION SYSTEM

(75) Inventors: Howard William Whitesmith, Cambridge (GB); Richard Lew Davies, Bedfordshire (GB); Andrew Jon Fell, Norfolk (GB); Charles Robert Sims, Hertfordshire (GB); Stephen Russell Taylor, Cambridge (GB); Kenneth John Lang, Wilts (GB)

(73) Assignee: Tagtec Limited, Willingham, Cambridge (GB)

( * ) Notice: Subject to any disclaimer, the term of this patent is extended or adjusted under 35 U.S.C. 154(b) by 168 days.

(21) Appl. No.: 10/489,720

(22) PCT Filed: Sep. 6, 2002

(86) PCT No.: PCT/GB02/04073

§ 371 (c)(1),
(2), (4) Date: Oct. 15, 2004

(87) PCT Pub. No.: WO03/023690

PCT Pub. Date: Mar. 20, 2003

(65) Prior Publication Data

US 2005/0052287 A1     Mar. 10, 2005

(30) Foreign Application Priority Data

Sep. 13, 2001   (GB) ................. 0122163.9

(51) Int. Cl.
*G08B 23/00* (2006.01)

(52) U.S. Cl. ............... 340/500; 340/572.1; 343/832

(58) Field of Classification Search ............ 340/500, 340/572.1–572.9, 505, 513, 825.69, 10.1; 235/462.13; 343/832
See application file for complete search history.

(56) References Cited

U.S. PATENT DOCUMENTS

| | | | |
|---|---|---|---|
| 5,305,008 A * | 4/1994 | Turner et al. .................. 342/44 |
| 5,649,296 A * | 7/1997 | MacLellan et al. ............ 455/39 |
| 5,842,118 A * | 11/1998 | Wood, Jr. ..................... 455/101 |
| 5,952,922 A * | 9/1999 | Shober ...................... 340/572.4 |
| 6,016,128 A * | 1/2000 | Imamura et al. ............. 343/741 |
| 6,236,315 B1 * | 5/2001 | Helms et al. ............... 340/572.7 |
| 6,243,012 B1 * | 6/2001 | Shober et al. .............. 340/572.7 |
| 6,265,963 B1 * | 7/2001 | Wood, Jr. .................... 340/10.4 |
| 6,373,389 B1 * | 4/2002 | Przygoda et al. ......... 340/572.4 |
| 6,972,683 B2 * | 12/2005 | Lestienne et al. ........ 340/572.1 |
| 7,057,511 B2 * | 6/2006 | Shanks et al. ............ 340/572.1 |

* cited by examiner

*Primary Examiner*—Phung Nguyen
(74) *Attorney, Agent, or Firm*—George R. McGuire; Bond Schoeneck & King, PLLC

(57) ABSTRACT

An RFID tag (200) and similar control/sensing unit (300) for a communications system are described. The control/sensing unit has a control element (301) having one or more states, and include an antenna (207) as well as an electrical circuit (201-206) generating a pulse control signal for controlling transmission from the antenna and varying a parameter of the pulse control signal in dependence on the state of the control element (301). Also disclosed is a receiving communication unit in the form of a base unit or system controller for such a communications system, the unit including a receiver (100) for receiving a pulsed RF signal and an electrical circuit (105-106) for detecting a parameter of the pulsed RF signal. An output circuit (107) then produces an output control signal dependent on the detected parameter of the pulsed RF signal.

37 Claims, 10 Drawing Sheets

WIRELESS COMMUNICATION SYSTEM

The present invention relates to a wireless communications system, particularly for use in building or asset security monitoring, and to the various components of such a system.

Applications of a system of this type include home, building and car security as well as domestic control applications.

In our earlier PCT patent application (WO-A-00/19235) we describe and claim a system for monitoring the position of one or more RFID tags, the system comprising one or more detectors incorporating means for receiving signals from the RFID tag for detecting changes in the range of an RFID tag from the detector or detectors; and control means comparing the signals received from the RFID tag at different times to detect a change in range of the RFID tag and triggering an alarm if a detected change in range exceeds a predetermined threshold.

Such a system may include tags which have circuitry arranged to emit short bursts of RF energy at periodic intervals, and the or each detector including circuitry for detecting changes in the periodic interval at which energy is transmitted by the or each tag. The or each detector preferably includes circuitry for predicting the time of receipt of a burst of energy from a tag and for triggering an alarm if the time of actual receipt varies from the predicted time of receipt by more than a predetermined interval and/or if the rate of change in the periodic interval at which energy is transmitted by a tag is outside a predetermined range. Alternatively, or additionally, the detector(s) may include circuitry for analysing changes in the rate of receipt of bursts of energy from a tag and for triggering an alarm if the rate of change is more than a predetermined level.

A system of this type may be utilised, for example in the home, for ensuring the security of components such as valuable equipment such as televisions, personal computers and the like, or other valuable items such as paintings, furniture and the like which may be relatively easily stolen by removal from their normal location, movement of a detector being recognised by the central controller and an appropriate alarm signal given.

The equipment senses a change in distance between a transmitter- receiver and an RFID tag which can be used to initiate an alarm or some other function.

Placing a controller and antenna within the vehicle or building and then fitting tags to each door can provide a very effective alarm system. Opening any door could set off the alarm. Installation is simple with none of the additional wiring that can be a major cost for manufacturers. Furthermore, a system of this type can be used for personal security in that a small portable system could easily be attached to hotel room doors and windows, and indeed to any valuable items it is desired to protect within the room.

According to a first aspect of the present invention there is provided a communication unit for a communications system, the unit including a control element having one or more states; an antenna; and an electrical circuit generating a pulse control signal for controlling transmission from the antenna and varying a parameter of the pulse control signal in dependence on the state of the control element.

Preferably, the antenna is a backscatter antenna for reflecting RF radiation impinging thereon, and the electrical circuit further includes a modulation element receiving the pulse control signal and modulating the radiation reflected by the backscatter antenna dependent on the control signal and hence the state of the control element. The control signal may comprises an input to the modulation element.

The control element may comprise a manually operable switch or a sensor for sensing one or more physical conditions. The control element may have two or more operative positions or a continuously variable output.

The sensor may include one or more of a movement detector; a light level detector; a gas detector; a smoke detector; a temperature detector; a sound level detector; an electromagnetic radiation detector; a humidity detector; pressure detector; and a fluid level detector.

The electrical circuit may also be able to vary the length of the repeating signal.

The repeating signal may be modulated to transmit binary data from the control unit.

A second repeating output signal may be output by the electrical circuit at the same period as the first signal and the time between the first and second signals may be adjustable dependent on the state of the control element. This could be achieved by generating the first pulse by a clock oscillator circuit with a divider chain to generate a repeating signal say once per second. The second pulse could be timed from the first pulse and so the design of the tag would be much the same as before but with the charging of the storage capacitor inhibited until the first pulse has finished. Once the first pulse has finished the capacitor is allowed to charge and when it gets to a threshold it can produce the second pulse. The time delay between the two pulses would then represent the inductive field strength.

The unit may comprise an RFID tag.

The unit may include an electromagnetic sensor adapted to receive electromagnetic radiation, and a power supply circuit for converting said radiation into electrical power for powering the unit.

According to a second aspect of the invention, there is provided a receiving communication unit for a communications system, the unit including a receiver for receiving a pulsed RF signal; an electrical circuit for detecting a parameter of the pulsed RF signal; and an output circuit for producing an output control signal dependent on the detected parameter of the pulsed RF signal.

The parameter is preferably the period between pulses of the pulsed signal or the length of the pulses of the pulsed RF signal. To achieve the latter, the receiving unit may contain a radio receiver which is able to detect the radio transmissions from the tag, demodulate these and convert them back to a baseband signal. Hence the output of the radio receiver would be a pulsed signal identical to that produced by the tag. The receiving communication unit would contain a microprocessor that is able to monitor the timing of the pulsed signals it is receiving and perform an operation based on the timing of these signals.

Alternatively, the parameter may the amplitude of the pulsed RF signal, in which case the demodulator would be an AM (Amplitude Modulation) demodulator which in its simplest form is a diode feeding a capacitor with a slow discharge path introduced across the capacitor. The output of this would be fed to a threshold detector and then to the microprocessor.

A third aspect of the invention provides a communications system having a transmitter arranged to transmit bursts of RF energy at a regular period; a communications unit having an antenna through which RF energy is received from the transmitter, storage means for storing the energy, an electrical circuit for generating output responses at a period dependent on the amount of energy stored and transmitting the output responses; and a receiving communications unit having an electrical circuit for receiving the output responses from the communications unit and for detecting the time of receipt of the output responses, determining if a change in the period of receipt of the responses occurs and, if so, generating an output.

A signal received by the receiving unit from the RFID control/sensing units will have time and amplitude characteristics that are a function of the relative positions of the receiving units and the RFID control/sensing units. The receiving unit creates a time-amplitude "picture" of the returned signal. The process is repeated and successive time-amplitude "pictures" are compared. Any variations are the result of changes in the relative positions of the receiving unit and RFID control/sensing units. The system can thus sense a change in distance between the receiving unit and two or more RFID control/sensing units which can be used to initiate an alarm or for some other purpose.

The system described may operate using time 'frames' which considerably simplifies and hence reduces the cost of implementing a detection system. The system controller simply has to measure a time delay before response of each tag which can be implemented with relatively simple circuitry.

If two tags transmit simultaneously then there will be a clash. To avoid this, the tags preferably contain a sensitivity switch that can either be manually set on the tag or automatically set by the system controller possibly during registration. The sensitivity switch can either switch in a different value of storage capacitor J, modify the charge/discharge rate to alter the delay time $t_2$.

During registration tags in a given system are individually registered to the system controller. If the tags are programmed with a code during manufacture then this allows the system controller to read and store the tag code or ID. Alternatively, the system controller may program the tags giving each subsequent tag a different code or ID. This reduces problems caused by clashes and interference from an identical system operated in the adjoining room or area as the system controller can distinguish tags in its system (which have been registered to it) from other tags.

The registration process may be carried out using radio or other wireless communication between tag and system controller, or the tag may have electrical contacts on it so that the registration can occur by direct connection between tag and system controller. The system controller may have a registration slot or similar designed into the caseworks with a microswitch or other means at the bottom of the slot for confirming the presence of the tag in the correct position, such that process of pushing a tag into the slot initiates registration.

Movement detection and choice of frequencies. As with the existing patent application the proposed system can detect changes of range or orientation of the tags. To reduce the effect of people and animals influencing the RF field around the tags, the frequency chosen for the transmission from system controller to tag is a relatively low frequency field currently (but not limited to) 125 KHz. Low frequency RF fields are relatively unaffected by people and animals and so the field strength at any given point in the detection zone is fairly constant despite the movement of people and animals.

The frequency chosen for transmission from tag to system controller is a relatively high frequency currently (but not limited to) 868 MHz which propagates easily with small antennas and low power available in the tag. An additional advantage is that high RF frequencies are influenced by people and animals and so it is potentially possible for the system controller to detect motion of people and animals in the room by monitoring the received signal strength generated by each tag, A sudden change in received signal strength indicates that a person or animal has moved in the detection zone. Variations in signal strength from a particular tag could give approximate location information about that person or object as this indicates that the person or object has moved into the area between a tag and the system controller.

Other forms of transmission from a tag or control/sensing unit back to the system controller, such as sound, light, infrared etc. may be utilised.

In WO-A-00/19235 we describe (see page 3, lines 20 et seq) how an RFID tag may be moved in a circular arc (ie without changing the distance between the transmitter-receiver and the RFID tag). This may result, depending on the orientation of the tag, in there being no change in the electromagnetic flux linking the antenna (coil) on the tag. In order to overcome this problem, and to ensure that any change in position or orientation of the tag can be detected, a number of options exist. The key to this is the recognition that in a field generated from a single coil in a base unit, there will be lines of flux that radiate out from the coil forming continuous loops. Perpendicular to the lines of flux will be lines of constant field amplitude conceptually similar to the "isobars" on a weather map. Theoretically a tag could be moved along one of these "isobars" without a change in field or flux amplitude linking with the coil in the tag. If the tag is able to sense the field in two or more directions however, then it would be extremely difficult to move the tag along an "isobar" without changing the coupling into one or more of the multiple pickup coils. Another advantage of having two or more base unit energising coils is that if they are energised sequentially and are physically separate then the 'isobars' will be in different directions and then it really would be impossible to move the tag without changing the coupling in one or more of the pick up coils in the tag.

In one use of a system according to the invention, the presence of an RFID tag within a chosen zone may be used to disable security monitoring of tagged items disposed in or adjacent that zone. This may be used, for example, in retail stores to allow items on display for sale to be removed from a display location by a sales assistant with a particular coded tag to be shown to a potential customer without triggering an alarm. Preferably, the items are protected by an RFID tag or similar according to the invention.

Another use of a system according to the invention is in the field of car park monitoring. By disposing a communications unit according to the invention at each bay and particularly by arranging for each tag to transmit signals with different parameters, the presence or absence of a vehicle in a bay may be readily determined without the need for hard-wiring of each bay, by means of a receiving communication according to the invention.

A number of examples of systems according to the present invention will now be described with reference to the accompanying drawings, in which.

A system falling within the terms of the present invention may have control/sensing units, tags, a system controller and associated components. Various examples of these will now be described.

Figure 1:
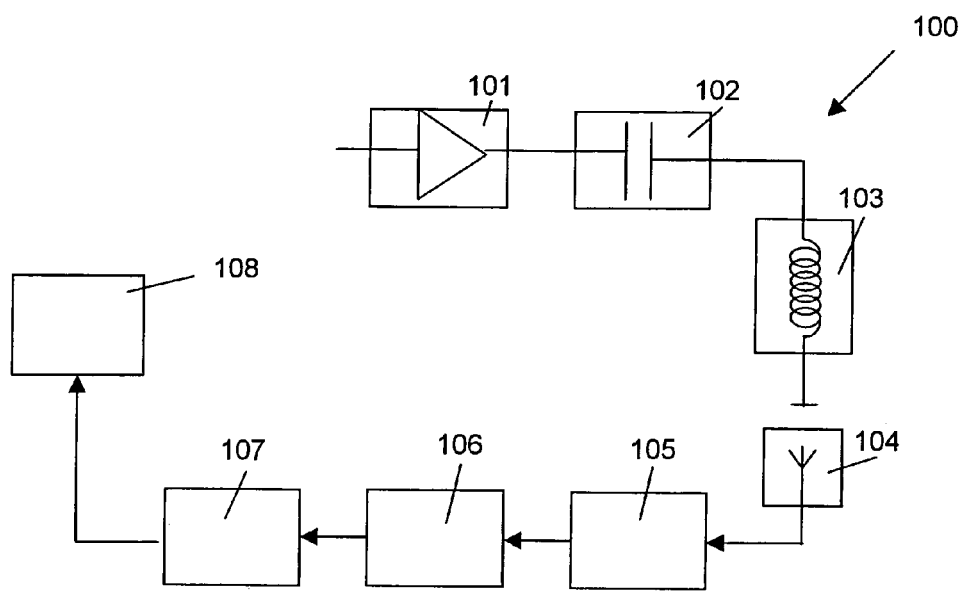
FIG. 1 is a block diagram of a first example of a system controller.

FIG. 1 shows a system controller 100 having a power amplifier 101 which may be a Class A, B, C or D amplifier and additionally could be an amplifier where the supply voltage is varied in order to control the output power and feeds a resonating capacitor 102 which is used to drive an inductive transmitter coil antenna 103 in resonance (to generate sufficient current). The inductive transmitter coil antenna 103 consists of an inductive winding which may be air-cored or may contain a ferrite or other high permeability material core. However, the antenna could be any other form of antenna such as dipole, monopole, slot, patch, room-loop etc.

The system controller 100 also has a receive antenna 104 which is used to receive radio frequency (RF) transmissions from plural tags 200 (see FIG. 2) and which, in some forms of the system, could be the same antenna as the antenna 103. However, in one form of the system the antenna 104 could be replaced by an infra-red or light detection device.

A controller radio receiver 105 receives the tag transmissions from the antenna 104 and converts the transmissions from RF into baseband signals and passes them to an optional decoder 106. The resulting baseband signal may contain codes transmitted by the tag(s) and the decoder 106 translates the codes into a form that can be used by a microprocessor 107. The microprocessor 107 processes the timing of received codes from the tags and in some implementations may perform the decoding of the tag transmission and/or clock recovery. It also controls a user interface 108 which may be a display, LED's, or keyboard and interfacing to other equipment.

Figure 2:
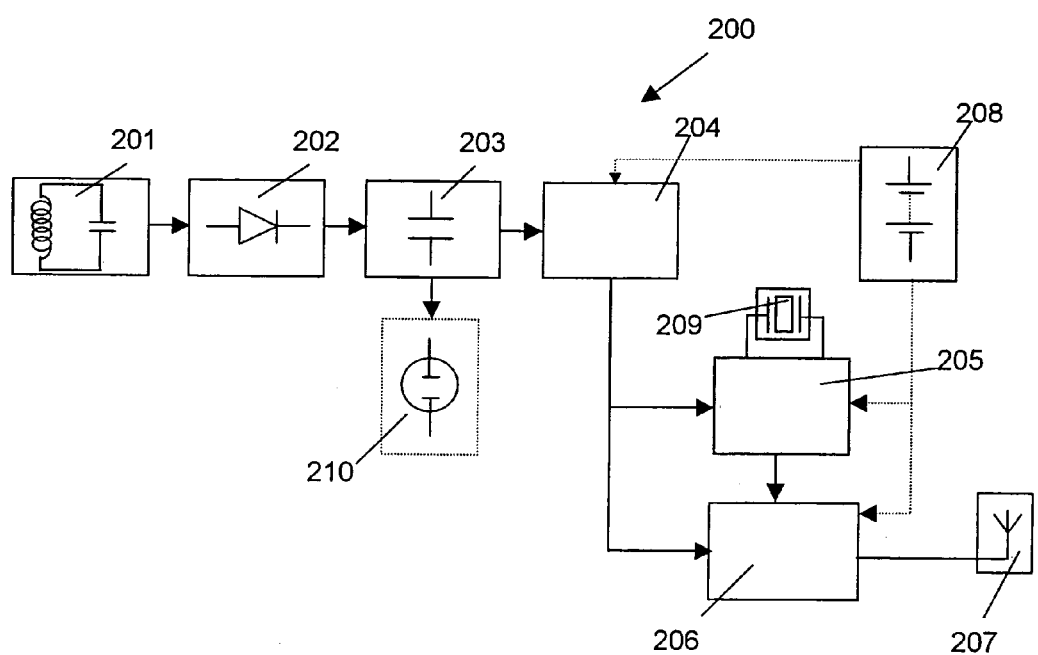
FIG. 2 is a block diagram of an example of an RFID tag for use in a system.

The system is capable of communicating with a number of RFID tags, the component parts of which are shown in FIG. 2.

Each tag 200 has an inductive pick-up coil or ferrite antenna 201 tuned to be resonant (at, for example, 125 KHz), and a rectifier 202, (which may be half-wave but could be full-wave or a diode charge-pump or an active rectifier circuit) and which receives energy from the antenna 201. The rectifier 202 may contain a biassing circuit to overcome the forward voltage drop of its diode or diodes.

A storage capacitor 203 stores the resulting energy which is used to power the tag 200 if it is passive, and/or used to trigger a detector 204 if it is active (containing a battery), or hybrid where some of the tag power is provided by the battery and some is provided by the transmissions from the system controller. The detector 204 triggers other circuitry dependent on the voltage/current experienced by the storage capacitor 203. In the this example, the detector 204 is capable of decoding/demodulating data transmitted by the system controller.

A code generator 205 stores a code either stored at manufacture or when later programmed into the tag 200 during registration of the tag to a given system controller 100; The code generator can reproduce this code when it is enabled by the detector 204 and generates a modulating signal to an RF transmitter 206. The code stored, could in some instances, be a rolling/cyclic code to improve detection and/or security of the system.

The transmitter 206 is an RF transmitter in this example, but could be an ultra-sound, infra-red, or light transmitter circuit transmitter. It responds to modulation from the code generator 205 to generate amplitude modulation (AM), ON/OFF modulation (OOK), amplitude-shift keying (ASK), frequency modulation (FM), frequency shift keying (FSK), phase modulation or other form of standard modulation scheme. Its output is passed to a transmission device or antenna 207 which could be an RF antenna, infra-red emitter, ultra-sound emitter or other propagating wave generator. In one form of the system the device 207 is an RF antenna used to produce 'RF backscatter' of an RF transmission from the system controller as described above.

The tag 200 may also (in some implementations) have a battery, solar cell, or storage capacitor 208. If the tag is 'active' it is powered by this device, but in other implementations of the system, the tag is powered by the transmissions from the system controller 100 and is a 'passive tag'. A third variant is a hybrid tag.

The tag 200 has a clock generator 209 which may be a crystal oscillator circuit or may be another form of electronic oscillator circuit or alternatively the clock generator may use an aspect of the controller transmissions to lock-on or regenerate a clock signal produced by the system controller.

To prevent excessive voltages appearing across the storage capacitor 203 a shunt regulator device 210 is provided.

In operation, (see FIG. 3) a tag 200 receives energy from the system controller 100 (in the form of a pulse shown in waveform 1 of FIG. 3) and uses this to charge the storage capacitor 203 using the rectifier 202 to convert from AC to DC. This is the tag charging phase and lasts for a time $t_1$ during which time the storage capacitor 203 is charged (see waveform 2 in FIG. 3).

The RF transmission from the base unit/system controller 100 then stops (or reduces in amplitude in a modification not shown) and the voltage on the tag storage capacitor 203 leaks away either naturally or via a dedicated discharge device on the tag 200. Once the capacitor voltage reaches a threshold Vt (see waveform 2 in FIG. 3) the detector 204 triggers and enables the code generator 205 and transmitter 206. The code generator 205 and transmitter 206 then produce (see waveform 3 in FIG. 3) a burst of RF or other radiation (possibly backscatter) that contains (in this example) a code—as shown by the waveform 4 of FIG. 3, which is an enlarged and expanded view of the waveform 3.

Figure 3:
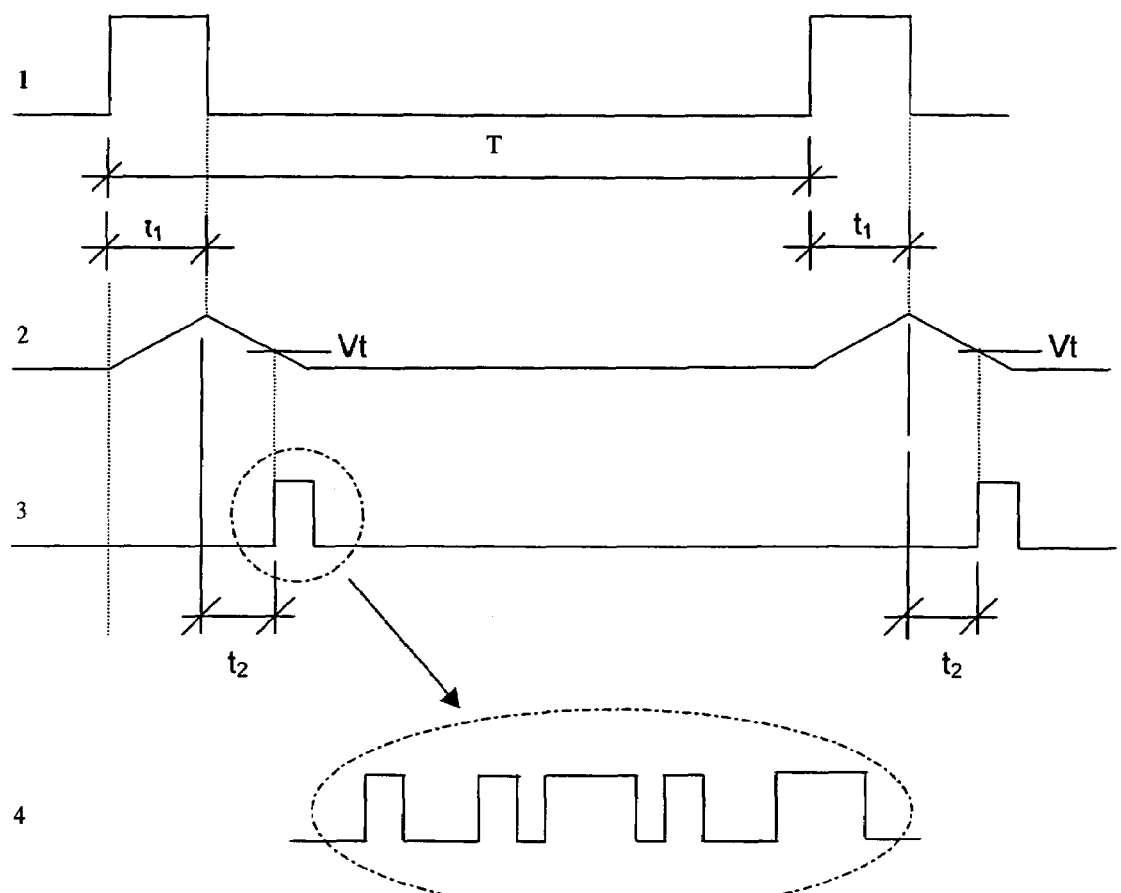
FIG. 3 is a timing diagram indicating the timing of various signals in the system shown in FIGS. 1 & 2.

The time between the system controller 100 switching off its transmission and the tag 200 responding back is shown as $t_2$ (in waveform 4 of FIG. 3). The length of this time $t_2$ gives an indication of the tag range (subject to orientation and polar co-ordinates with respect to the controller transmitter coil). If the time $t_2$ for a particular tag changes and the field strength in the interrogation zone is reasonably constant from one burst or frame to another, the system controller is able to detect that the tag has moved with respect to the controller transmitter.

In a modification, the power source 208 could be say a Peltier charge pump device. If the Peltier device were subjected to a thermal gradient it would generate a small amount of current which could potentially power the electronics of the tag without the need for a battery (or could charge a battery if fitted). Alternatively, the powering device could also be a solar cell on its own or a solar cell that charges a high value capacitor or battery. If a battery is fitted it could be a primary, non-rechargeable cell or a secondary, rechargeable cell.

Figure 4:
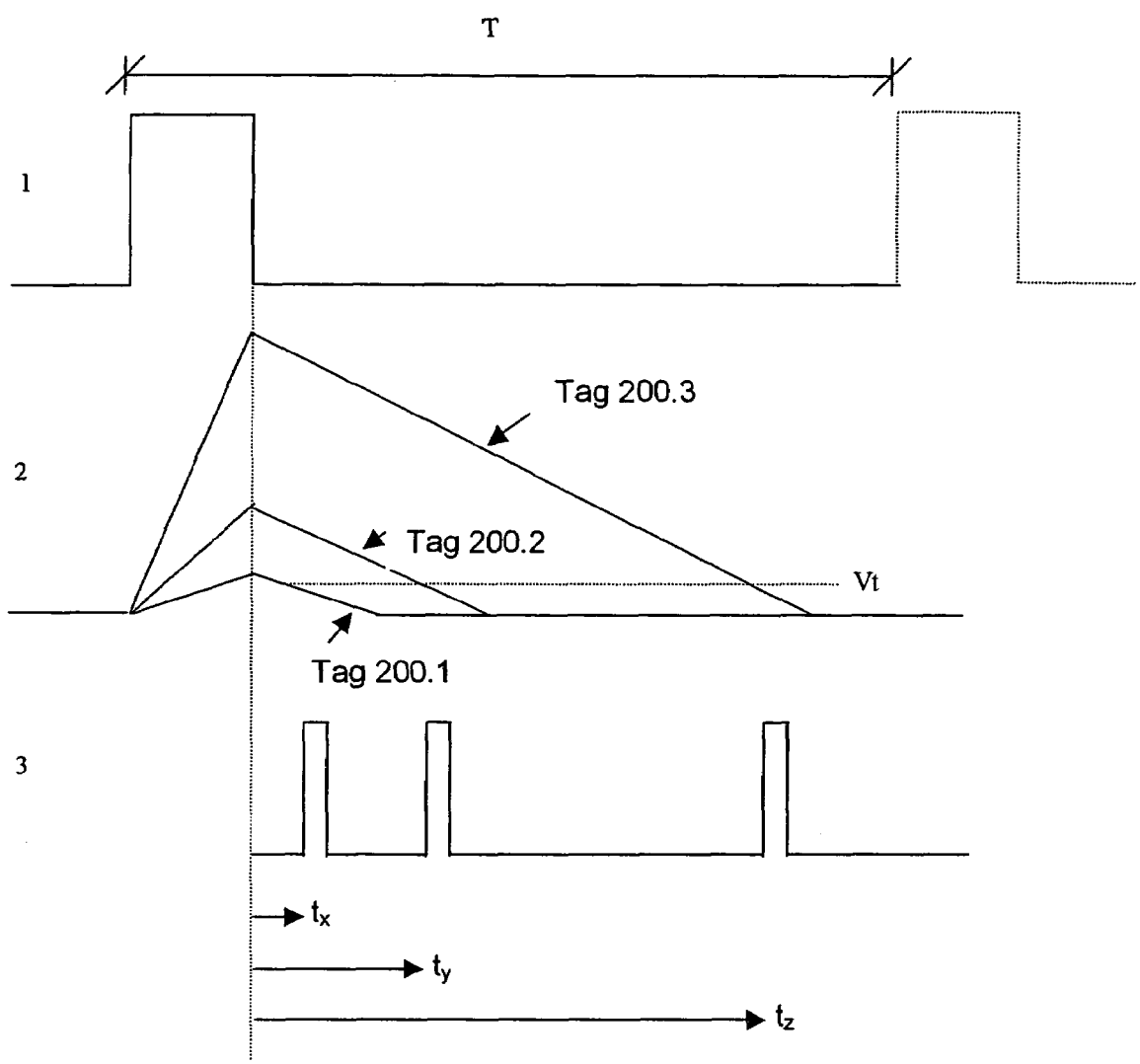
FIG. 4 is a further timing diagram indicating the timing of various signals in a system of the type shown in FIGS. 1 & 2, when multiple tags are present.
Figure 5:
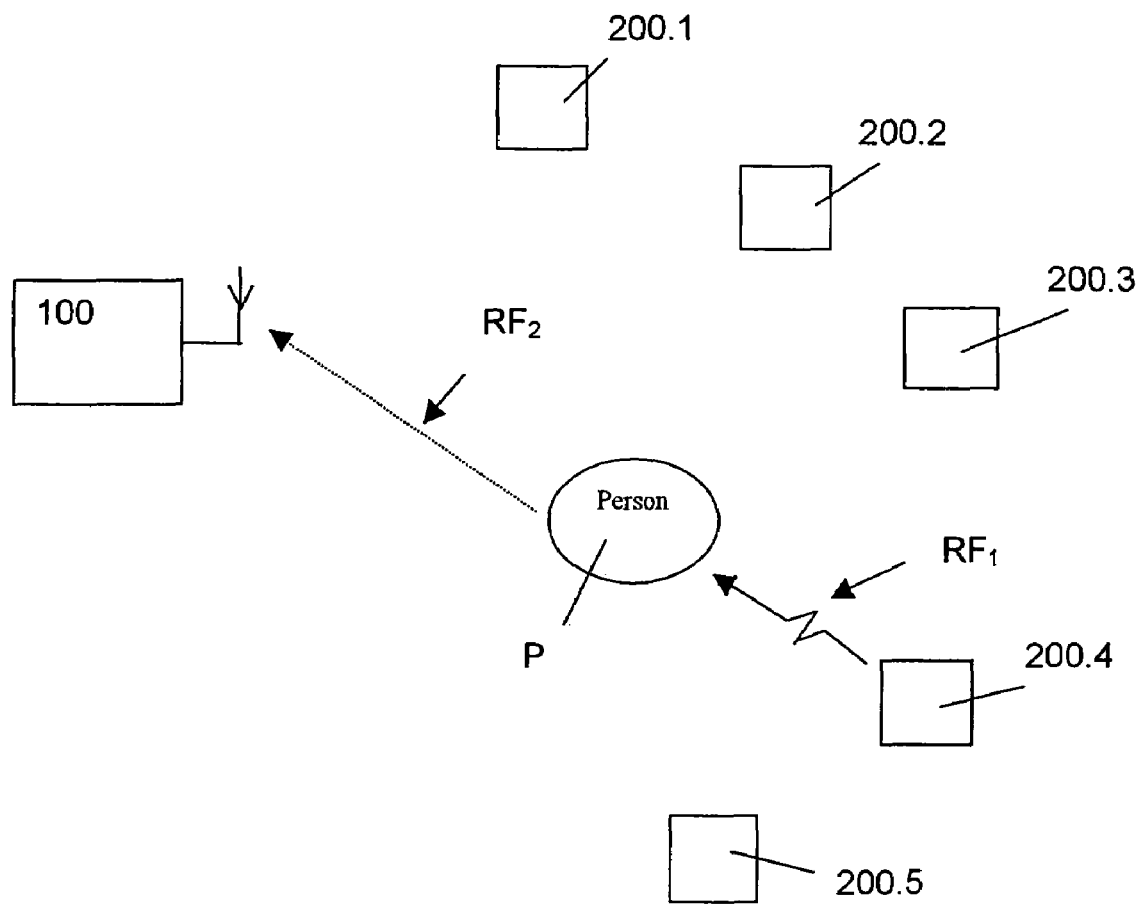
FIG. 5 illustrates a system having multiple tags and which may be used, additionally, to detect movement of a person within the area covered by the system.

The interrogation zone may include a number of tags 200.1-200.5 as illustrated in FIGS. 4 & 5. In this case the response time of each tag 200 can be identified. If each tag contains a unique code then the movement of a particular tag can be detected. In one form of the system the tags do not have an ID and the system controller can still detect if one of the tags has moved by looking at successive time frames or pictures and detecting a change in timing of one of the responses.

FIG. 4 illustrates, in waveform 1, an energising pulse from the system controller 100 and waveform 2 shows the charging of the storage capacitors in three tags 200.1, 200.2 & 200.3, the charging rate for each of which is different depending on the tags' positions and orientation which affect the electromagnetic field at each tag. As a result, each of the tag capacitors is charged to a different voltage as shown and the time each takes to decay to the voltage $V_t$ is also different therefore as shown in waveform 3.

The system controller 100 transmits another burst of RF energy again after a time T (see waveform 1 in FIG. 4) at which point the process repeats.

The system controller 100 may vary the power of the transmission burst, the frequency, or the repetition interval T in order to improve the detection algorithms implemented in the microprocessor 107 (or provide some other performance benefit).

The charging/discharging waveforms are shown as linear for simplicity, but these may be exponential or other.

Movement detection is also possible using systems according to the invention and this is also illustrated in FIG. 5. To reduce the effect of people and animals influencing the RF field around the tags and supplying energy to the tags, the frequency chosen for the transmission from system controller to tag is preferably a relatively low frequency field currently (but not limited to) 125 KHz. Low frequency RF fields are relatively unaffected by people and animals and so the field strength at any given point in the detection zone is fairly constant despite the movement of people and animals.

The frequency chosen for transmission from tag to system controller is a relatively high frequency currently (but not limited to) 868 MHz which propagates easily with small antennas and low power available in the tag. An additional advantage is that high RF frequencies are influenced by people and animals and so it is potentially possible for the system controller to detect motion of people and animals in the room by monitoring the received signal strength generated by each tag. A sudden change in received signal strength indicates that a person or animal has moved in the detection zone. Variations in signal strength from a particular tag could give approximate location information about that person or object as this indicates that the person or object has moved into the area between a tag and the system controller.

As shown in FIG. 5, the RF signal from tag 200.4 is attenuated by a person P standing between tag 200.4 and the system controller 100. This attenuates the RF transmission, reducing the received signal strength at the system controller 100 and gives approximate location information for the person. In a security system, this proposed technique could remove the need for passive infra-red (PIR) (or other types of motion detectors) in the room in addition to the present system.

Figure 6:
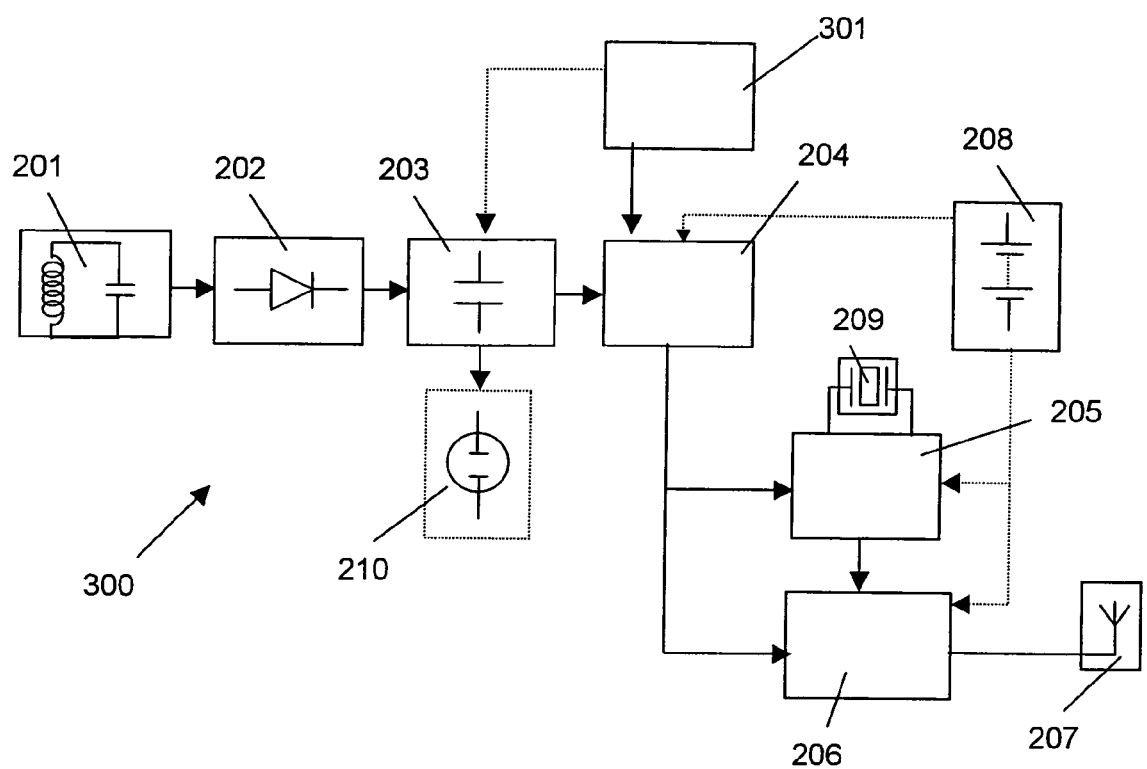
FIG. 6 is a block diagram of an example of a control and sensing unit.

The system is also capable of being used for home automation, environmental control etc. and a control/sensing unit 300 for such a purpose is illustrated in FIG. 6.

The control/sensing unit 300 has components substantially the same as the tag 200 illustrated above in FIG. 2, but additionally includes a desired sensor 301 (eg. a light, temperature, air flow, pressure, humidity, radiation, sound or other ambient condition sensor or a simple on-off or variable position switch).

In this case all the control/sensing units 300 are charged to the same nominal voltage, then the system controller transmission ceases. The sensor (or switch) 301 then modifies the discharge rate or trip threshold $V_t$ in order to modify the delay time $t_2$.

Figure 7:
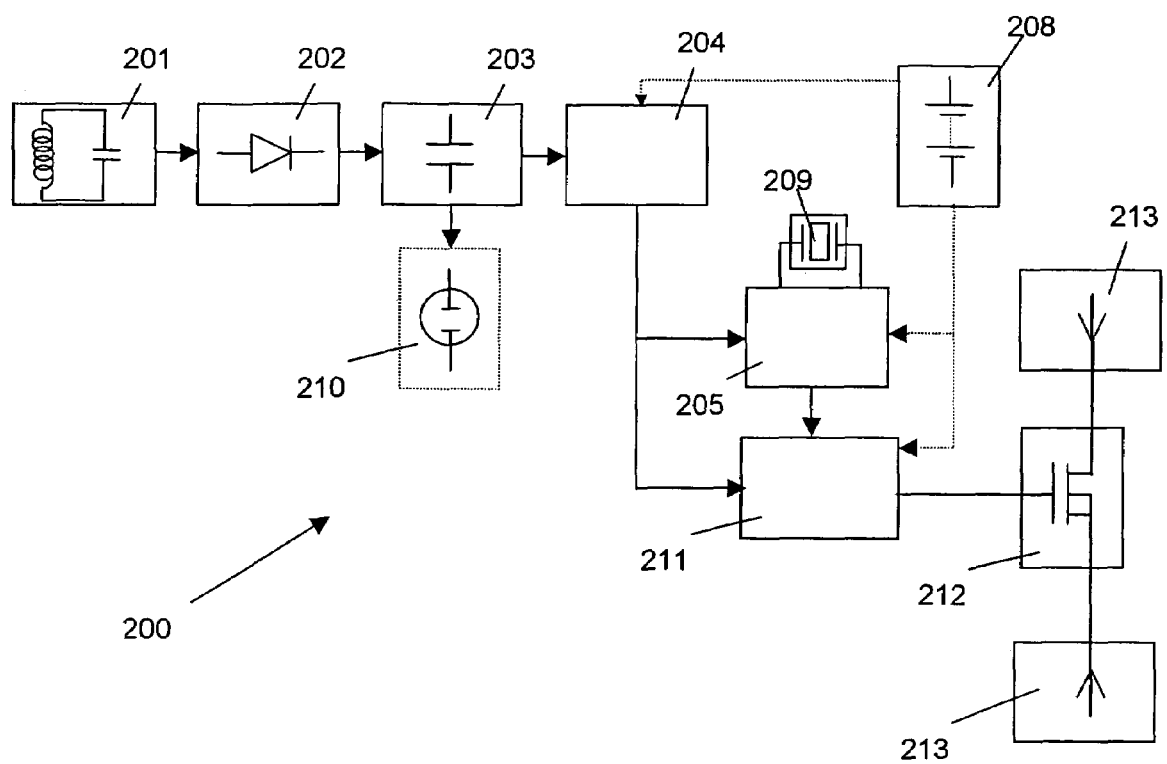
FIG. 7 is a block diagram of a tag incorporating a backscatter antenna.

FIG. 7 illustrates a tag utilising a backscatter communication technique. In the Figure is shown a tag similar to that of FIG. 2, but includes a frequency modulator or divider 211 in place of the transmitter 206 and also a backscatter modulation transistor 212 and a backscatter antenna 213 in the form (as shown) of a dipole antenna.

As described above, a short burst, or 'chirp', of RF energy is produced at periodic intervals and when the voltage on the capacitor 203 reaches a preset threshold, after a time dependent on the RF field, the detector 204 senses this and enables the frequency modulator 211 which divides the inductive input frequency by two (or by some other constant) and produces an output that drives the backscatter modulation transistor 212. When the voltage on the capacitor 3 falls to a lower threshold the detector 204 disables the frequency divider 211, thus disabling the output to the backscatter modulation transistor 212. The process then repeats. The result is that the backscatter transistor 212 is driven with bursts of modulation at 62.5 kHz every time the tag "chirps". Of course, the same principle can be used with a control/sensing unit 300.

Figure 8:
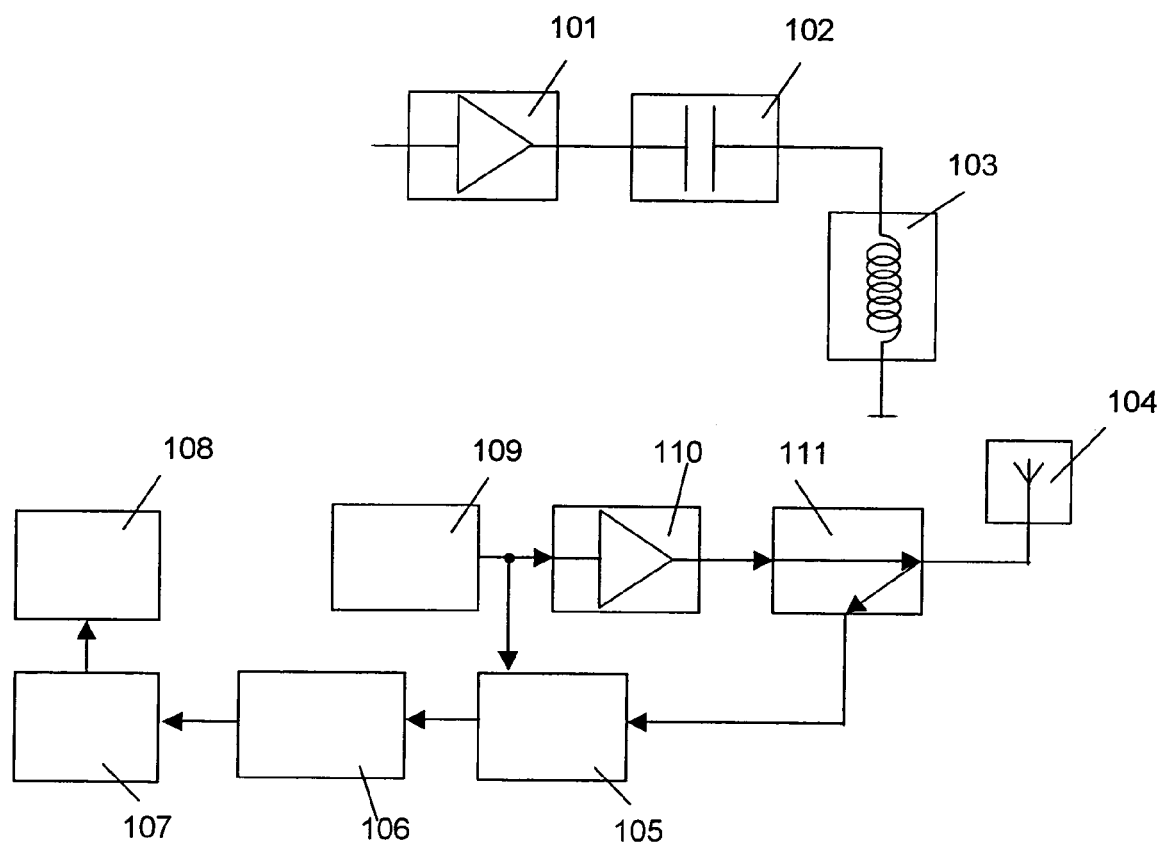
FIG. 8 is circuit diagram of a system controller adapted to use the backscatter technique.

The inductive energising system 101-103 of the system controller shown in FIG. 8 operates in exactly the same as that of the system controller described previously. The backscatter receiver operates as follows:

An RF source 109 generates an unmodulated RF carrier. Some of this RF signal is fed to an RF buffer amplifier 110 and some of the signal is fed to the receiver circuit 105. The RF buffer amplifier 110 amplifies and buffers the RF signal and then feeds this to a directional coupler 111 which allows the RF power to be passed to the antenna II. This unmodulated RF carrier is emitted by the antenna 104 as a continuous wave RF signal which then propagates into the area around the system controller 100. The tag's backscatter modulating antenna 213 modulates this continuous wave signal in coded or uncoded bursts when it transmits. The bursts of modulation at the tag 200 generate modulation sidebands caused by the reflected energy from the tag which can be received by the antenna 104. This received RF power is channelled by the directional coupler 111 into the receiver 105. The antenna 104 thus operates as a transmit and receive antenna simultaneously. The receiver 105 takes the received RF signal containing the modulation sidebands and mixes this with the raw unmodulated RF carrier generated by the RF source 109. The mixing process (a well known RF technique) translates the RF signal containing the sidebands to a low-frequency baseband signal containing the tag data transmissions in modulated form. This signal is fed to a demodulator/decoder 106 which outputs the unmodulated tag data. This data is fed to the microprocessor circuit 107 which performs all the decoding algorithms needed to process the tag transmissions. The microprocessor circuit also controls the user interface 108 which is used for configuring the system, displaying alarm conditions and communicating alarm conditions to other equipment.

As the chirp rate of each control/sensing unit 300 in a system is dependent upon the incident electromagnetic field, control/sensing units at different distances will chirp at different rates and they can therefore be differentiated from one another.

The circuitry of the control/sensing units 300 and the tags 200 may also be configured to allow changes to be made to the length and shape of the chirp waveform and also allow changes to be made to the nature of the variation of the output signal.

The system may also include a process for registration of tags 200 (and/or control/sensing units 300) on installation. During registration the tags in a given system are individually registered to the system controller. If the tags or control/sensing units are programmed with a code during manufacture then this allows the system controller to read and store the tag code or control/sensing unit ID. Alternatively, the system controller may program the tags giving each subsequent tag a different code or ID. This reduces problems caused by clashes and interference from an identical system operated in the adjoining room or area as the system controller can distinguish tags in its system (which have been registered to it) from other tags.

The registration process may be carried out using radio or other wireless communication between tag and system controller, or the tag may have electrical contacts on it so that the registration can occur by direct connection between the tag and the system controller. Additionally, the system controller may have a registration slot designed into the caseworks with a microswitch at the bottom of the slot such that process of pushing a tag into the slot initiates registration.

Figure 9:
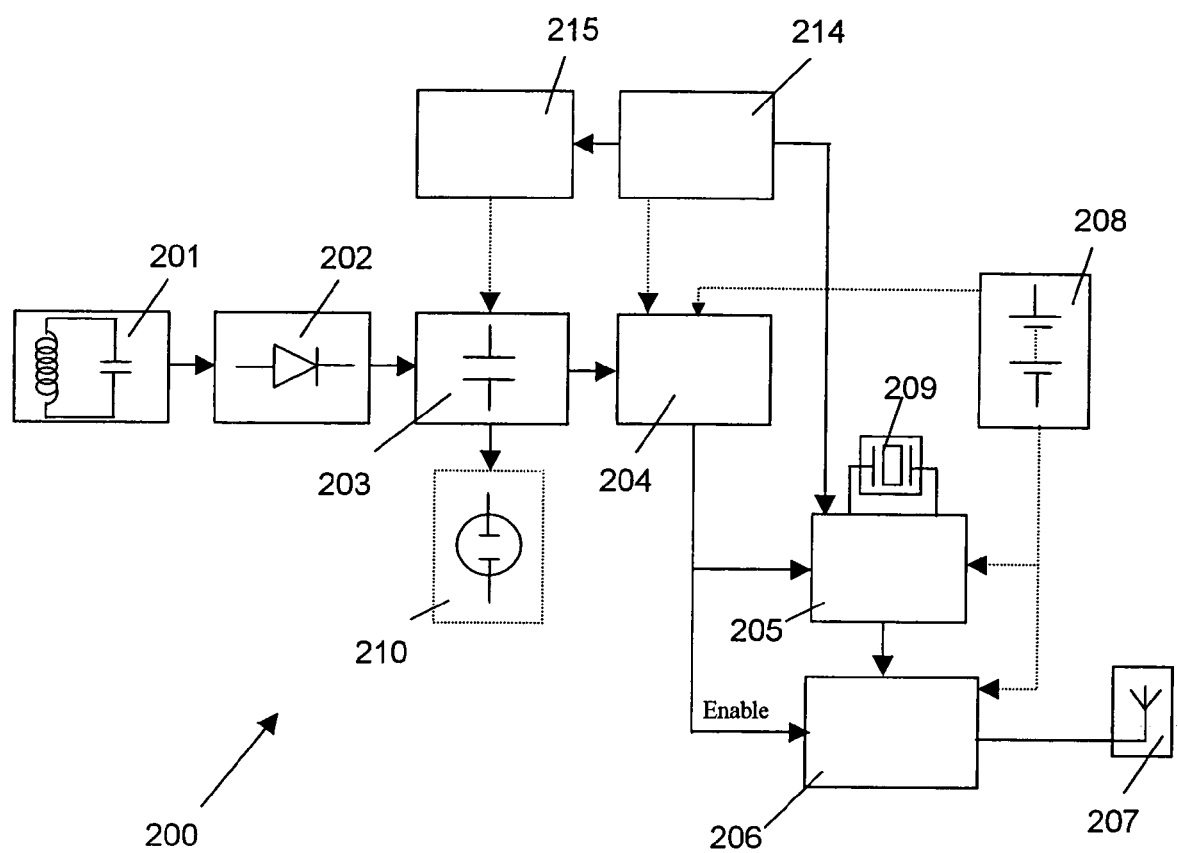
FIG. 9 shows a modified form of tag which may be used for enabling the tag to be 'registered' to a given system controller on installation.

One method by which registration can be carried out is illustrated by reference to FIG. 9, which shows a modified tag 200 which has an electronic memory 214.

Registration is started, for example, by a tag or control/sensing unit entering the operating zone of a system controller, by operating a switch on the tag or control/sensing unit or by slotting the tag into a 'registration slot' on the system controller.

Once the registration process has started, the system controller can read the tag ID (if it has one programmed at manufacture) or program a unique ID onto the tag if it is not pre-programmed. The ID code is stored on the tag using a suitable form of electronic memory 214, eg an electrically erasable programmable read only memory (EEPROM).

The ID code stored in memory is used by the code generator 205 to transmit a modulation sequence using the transmitter 206 and antenna 207.

When the tags have been mounted to the items to be protected there is a finite probability that the delay time $t_2$ happens to be the same as another tag. In this instance the system controller will receive corrupted data transmissions from two or more tags whose data bursts 'collide'. The system controller 100 will indicate an error to the user who will take the last placed tag back to the system controller to be re-registered. This time during registration the system controller will store a different discharge constant on the memory 214 which together with a programmable discharge device 215 (for example in the form of a resistor network or current sink) will ensure a different discharge slope for that tag and so avoid collisions. Alternatively, the constant stored in the memory 214 will influence the voltage threshold $V_T$ in order to modify the response time and avoid collision. The definition of the threshold or the discharge rate could also be controlled directly by the tag ID to reduce data storage on the tag. Other methods of modifying the discharge rate or threshold include having a mechanical switch on the tag or tear-off strip to modify the capacitance J by the user and so modify the response time of the tag.

Again referring to FIG. 9, the electrical circuit may also be able to vary the length of the repeating signal, which length could be used to convey information about the identity of the tag or to convey information about the field strength back to the system controller. The method of doing this would be modify the decay rate of the storage capacitor 203. This can be controlled by the discharge device 215. If one were to modify the discharge rate this would have the effect of varying the pulse width when the tag 'chirps'.

An alternative scheme to avoid data collisions following registration uses a variation of the system already described but this time the tag is used to measure the delay time. The tag has a counter on board which is used to measure the time delay between the tag being energised and the capacitor voltage reaching a preset threshold. The count value is latched into a register on the tag. Once 125 KHz transmission burst from the system controller ceases, the tag transmits back to the system controller a packet of data containing the tag ID code and count value. In order to avoid collisions, the tag transmissions are allocated to time slots which are synchronised with the controller bursts. During registration, each tag is allocated a different ID code and time slot for transmission back to the system controller so even if all the tags have the same delay time they can transmit back to the system controller without collisions.

Figure 10:
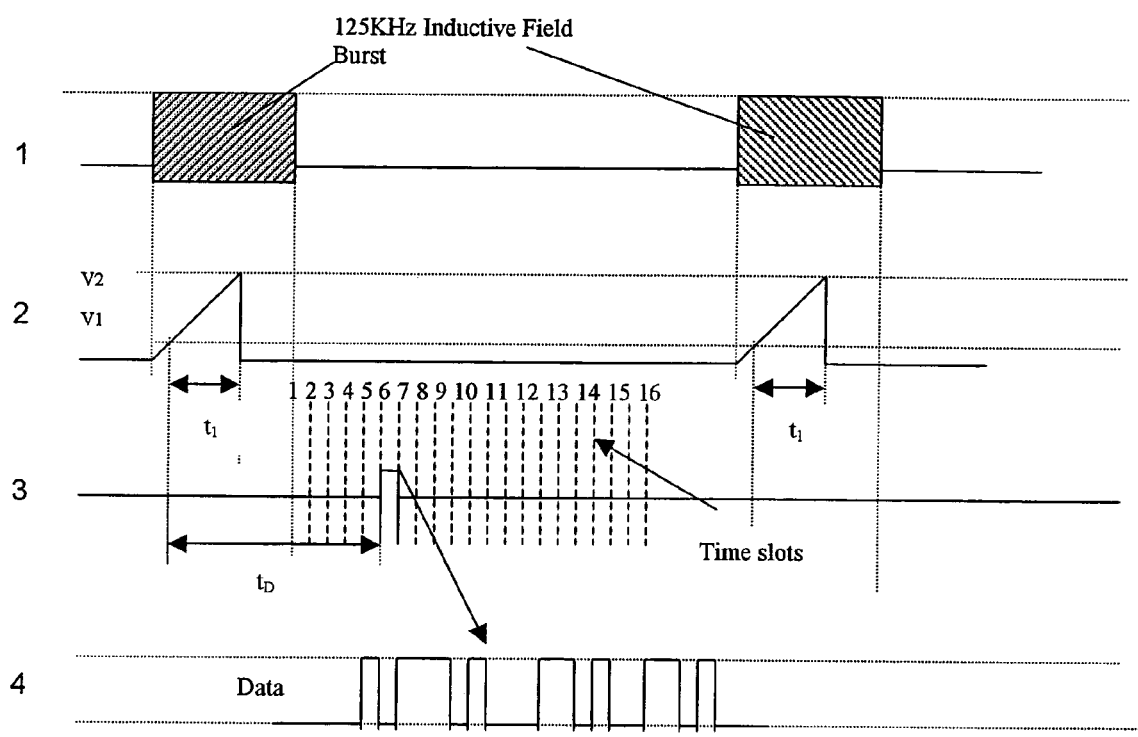
FIG. 10 is a timing diagram illustrating a method of carrying out an anti-collision scheme.

In detail and with reference to FIG. 10, the tag itself measures the delay time $t_1$, which is the time delay between the capacitor voltage on capacitor 203 charging between two voltage thresholds $V_1$ and $V_2$. The tag's on-board oscillator circuit 209 can be used in conjunction with a counter circuit to measure the time $t_1$. The tag latches this count value into a register on the tag. During the registration process with the system controller, the system controller allocates an ID code to the tag which is stored on the tag in a memory element such as an EEPROM. In addition to allocating an ID code to the tag during registration, the system controller also allocates the tag a unique "time-slot" for it to respond back to the system controller as illustrated in the diagram below (as time slots 1-16). In the diagram the tag has been allocated to timeslot 6 and this is also stored in the on-board memory of the tag.

An advantage of this proposed system is that each tag is allocated to a unique time-slot and the maximum number of tags is purely limited by the total number of timeslots available. If a new tag is registered the system controller simply allocates it the next consecutive time slot to respond in. Each data packet sent back to the system controller contains the ID code and the time measurement $t_1$ (which represents the field strength) along with formatting data and error checking.

Figure 11:
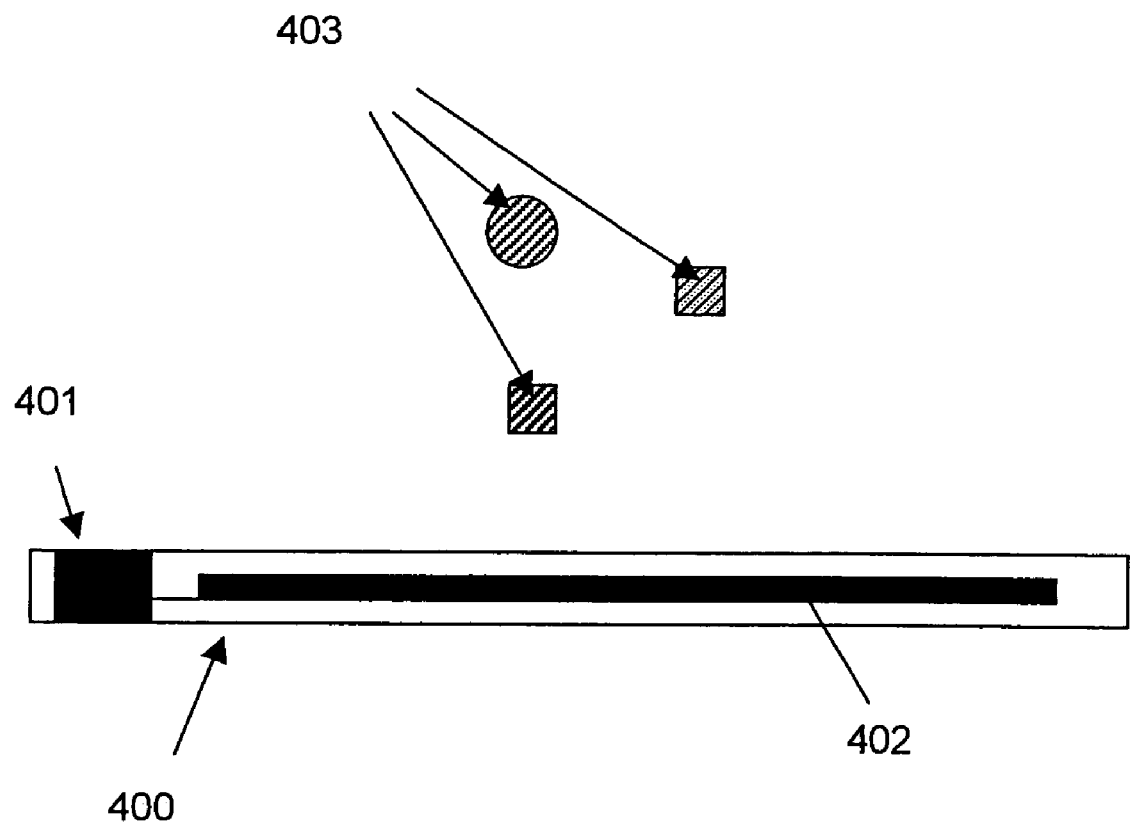
FIG. 11 is a diagrammatic representation of a further embodiment which can be used to detect movement of metallic objects towards or away from a specific location.

FIG. 11 illustrates how the same principle can be applied to detecting movement of metallic articles (or articles which have a metallic component or attachment). The presence of metal in the electric field around a tag produces a different tag response (chirp rate) to that produced when no metal is present and this operational feature can be used, in much the same way as described with reference to FIG. 5 (for detecting movement) to provide an alarm function.

FIG. 11 shows a pad or mat 400 which incorporates electronics 401 identical to the electronics of a tag 100 as described above (a pad-tag), but with an extended inductive loop pick-up or antenna 402. Metallic articles 403 are shown adjacent the mat.

Pad-tags such as this could be used in the home or retail environment and a modified version could be incorporated into a supermarket shelf or the like. A field modifying component in the form, say, of a small coil or loop tuned to the energising frequency (currently 125 KHz), a patch of foil, a piece of ferrite, or some other material that influences the RF field can then be attached to articles which it is desired to monitor. As long as the material influences the field strength in some way it should be possible to detect an item being placed on or removed from the pad-tag.

The tag-pad is identical electrically to the other variants of tags already. described. However in this instance the tag is kept stationary with respect to the energising coil 103 of the system controller 100. The system controller monitors the pulsing signal in any of the methods described previously and so is able to detect that the item to be protected from theft has moved.

The invention claimed is:

1. A communications system comprising:
   a transmitter arranged to transmit bursts of RF energy at a regular period;
   a communication unit having an antenna through which RF energy is received from the transmitter, a control element having one or more states, and an electrical circuit for generating, controlling the period of, and transmitting a pulsed RF output signal from the communications unit in dependence on the state of the control element, through a second antenna; and
   a receiving communications unit having a receiver for receiving the pulsed RF signal from the communications unit, and including an electrical circuit for detecting, as a parameter of the pulsed RF signal, the time of receipt of the pulsed RF output signal, determining if a change in the period of receipt of the responses occurs and, if so, generating an output control signal dependent on the change in the period of receipt of the pulsed RF signal.

2. A communications system according to claim 1, wherein the second antenna is a backscatter antenna for reflecting RF radiation impinging thereon; and
   the electrical circuit further includes a modulation element receiving the pulse control signal and modulating the radiation reflected by the backscatter antenna dependent on the control signal and hence the state of the control element.

3. A communications system according to claim 1 or claim 2, wherein the control element comprises a manually operable switch.

4. A communications system according to claim 1 or claim 2, wherein the control element includes a sensor for sensing one or more physical conditions.

5. A communications system according to claim 1 or claim 2, wherein the control element has two operative positions.

6. A communications system according to claim 1 or claim 2, wherein the control element has a continuously variable output.

7. A communications system according to claim 1, wherein the control element includes a sensor for sensing one or more physical conditions, and the sensor includes one or more of a movement detector; a light level detector; a gas detector; a smoke detector; a temperature detector; a sound level detector; an electromagnetic radiation detector; a humidity detector; pressure detector; and a fluid level detector.

8. A communications system according to claim 1, wherein the electrical circuit is also able to vary the length of the pulsed output signal.

9. A communications system according to claim 1, wherein the pulsed RF output signal is modulated to transmit binary data from the control unit.

10. A communications system according to claim 1, wherein a second pulsed RF output signal is output by the electrical circuit at the same period as the first signal and the time between the first and second signals is adjustable dependent on the state of the control element.

11. A communications system according to claim 1, wherein the pulsed RF output signal comprises an output signal output through the second antenna.

12. A communications system according to claim 1, wherein the unit comprises an RFID tag.

13. A communications system according to claim 1, wherein the unit includes a battery for powering the unit.

14. A communications system according to claim 1, wherein the unit includes an electromagnetic sensor adapted to receive electromagnetic radiation, and a power supply circuit for converting said radiation into electrical power for powering the unit.

15. A communications system according to claim 14, wherein the electromagnetic sensor is an RF sensor adapted to receive RF radiation.

16. A communications system according to claim 14, wherein the electromagnetic sensor is a light sensor adapted to receive light radiation.

17. A communications system according to claim 1, wherein the communication unit includes a heat sensor adapted to receive heat, and a power supply circuit for converting the heat into electrical power for powering the communication unit.

18. A communications system according to claim 1, wherein the second antenna is embedded in or attached to a pad or mat.

19. A communications system according to claim 1, wherein the second antenna is embedded in or attached to an item or furniture.

20. A communications system according to claim 1, including means for demodulating binary data also transmitted by said pulsed RF output signal.

21. A communications system according to claim 1, wherein the electrical circuit of the receiving communication unit includes a radio transmitter for transmitting the output control signal.

22. A communications system according to claim 1, wherein the output circuit includes an infra-red transmitter for transmitting the control signal.

23. A communications system according to claim 1, wherein the output control signal is a digital control signal.

24. A communications system according to claim 1, including a base unit having a transmitter comprising a discrete RF antenna.

25. A communications system according to claim 1, wherein said transmitter includes an electrical circuit for modulating the frequency of the transmitted RF radiation.

26. A communications system according to claim 1, wherein the base unit includes an RF receiver for receiving RF radiation and producing an electrical current to power the base unit.

27. A communications system according to claim 1, wherein said transmitter includes an electrical circuit for transmitting digital data from the base unit.

28. A communications system according to claim 1,
   wherein said receiving communication unit communicating with an environmental control system to control at least one parameter of said environmental control system.

29. A communications system according to claim 28, wherein said parameter is one of a lighting circuit control parameter; an air conditioning circuit control parameter; a heating circuit control parameter; a ventilation circuit control parameter; a humidity circuit control parameter; an access circuit control parameter; and a security circuit control parameter.

30. A communications system having
a transmitter arranged to transmit bursts of RF energy at a regular period;
a communications unit having an antenna through which RF energy is received from the transmitter, storage means for storing the energy, an electrical circuit for generating output responses at a period dependent on the amount of energy stored and transmitting the output responses; and
a receiving communications unit having an electrical circuit for receiving the output responses from the communications unit and for detecting the time of receipt of the output responses, determining if a change in the period of receipt of the responses occurs and, if so, generating an output.

31. A system according to claim 30, including plural communications units.

32. A system according to claim 31, wherein each communications unit includes a sensitivity switch for modifying the rate at which RF energy is stored.

33. A system according to claim 30, wherein the communications unit electrical circuit has means for discharging the stored energy and the output responses of the communications unit are generated when the stored energy reaches a given value, whereby the period at which the output responses of the communications unit are generated is determined by the time taken for the stored energy to reduce from its maximum value to the given value.

34. A system according to claim 33, wherein the or each communications unit includes a sensitivity switch for modifying the rate at which RF energy is stored.

35. A system according to claim 33, wherein the or each communications unit includes a sensitivity switch for modifying the rate at which RF energy is discharged.

36. A system according to claim 30, wherein the communications unit electrical circuit includes means for transmitting a coded output signal.

37. A system according to claim 30, wherein the transmitter is arranged to transmit RF energy at a relatively low frequency, the communications unit is arranged to transmit output responses at a relatively high RF frequency, and the receiving communications unit electrical circuit is arranged to detect changes in the strength of the received output responses.

* * * * *